Figure 1:
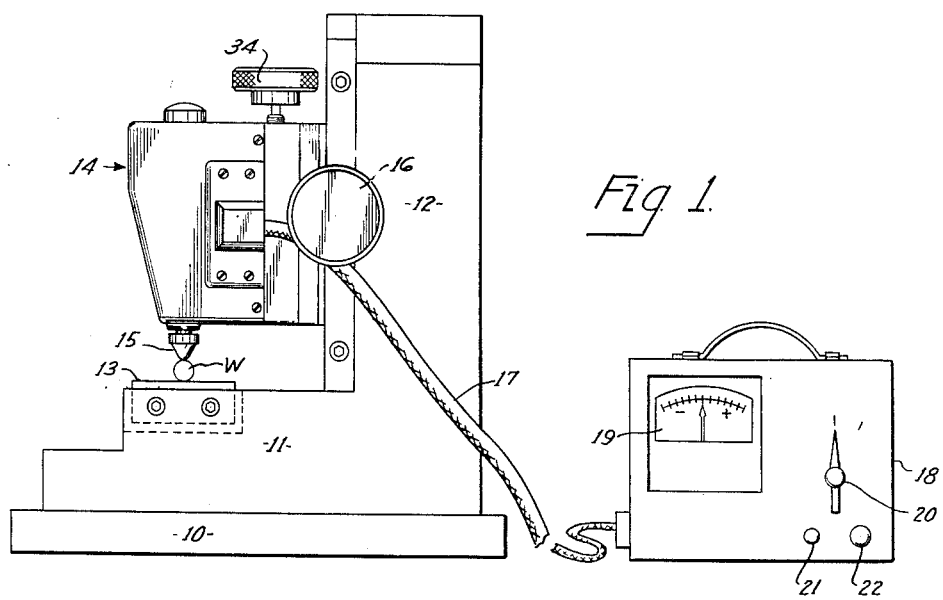

Feb. 3, 1953 E. W. GRAHAM 2,627,119
ELECTROMAGNETIC PICKUP FOR GAUGING DEVICES
Filed Feb. 24, 1951 2 SHEETS—SHEET 1

INVENTOR.
ERWIN W. GRAHAM
BY Bosworth & Sessions
ATTORNEYS.

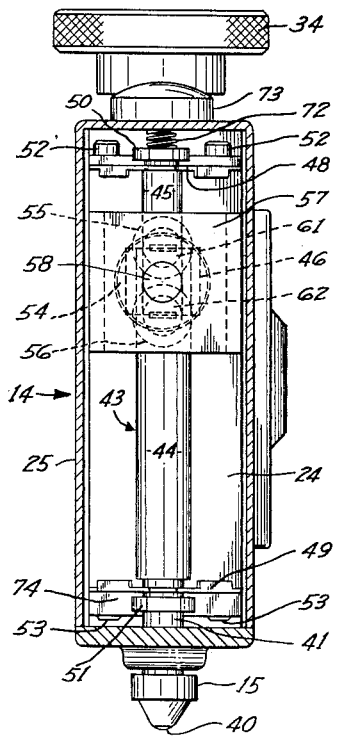
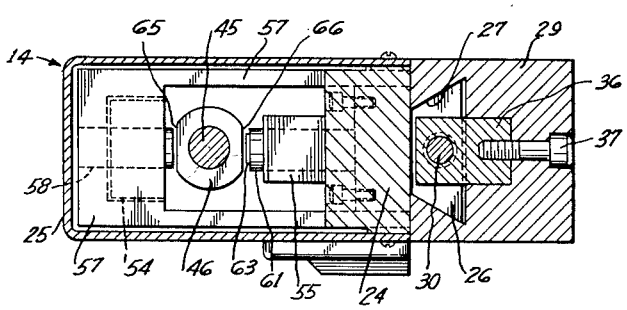
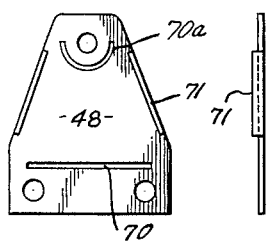
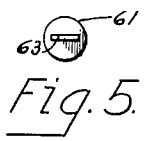
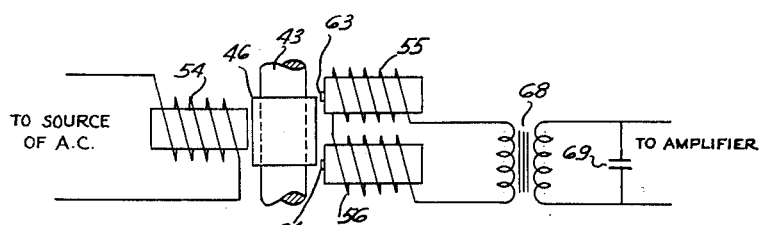
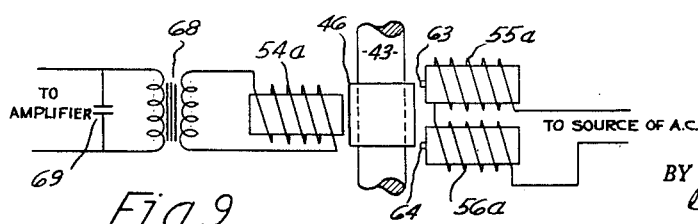

Patented Feb. 3, 1953

2,627,119

UNITED STATES PATENT OFFICE 2,627,119

ELECTROMAGNETIC PICKUP FOR GAUGING DEVICES

Erwin W. Graham, Parma Heights, Ohio, assignor to Cleveland Instrument Company, a corporation of Ohio Application February 24, 1951, Serial No. 212,653

19 Claims. (Cl. 33—172)

This invention relates to measuring instruments and more particularly to gauges, comparators and the like of the type embodying an electro-mechanical transducer or pickup and an electronic amplifier in which the output of the transducer is amplified and caused to operate a meter to give an indication of the dimension being measured.

The general object of the invention is the provision of a gauge, a comparator or the like by means of which extremely precise measurements, e. g., measurement to within one-millionth of an inch, can be made repeatedly and rapidly without requiring great care or skill on the part of the operator of the instrument. A further object is the provision of a rugged and sturdy instrument of high sensitivity. Another object is the provision of such an instrument which is compact and readily portable. A further object is the provision of a highly sensitive instrument in which lateral forces applied to the gauging point do not substantially affect the readings of the instrument. Other objects are the provision of a gauge in which comparatively light gauging pressures can be employed; the provision of a gauge that can be manufactured at reasonable cost; the provision of a highly sensitive electromagnetic pickup for use in gauging devices; and the provision of an electromagnetic pickup in which a comparatively small movement of the armature of the pickup produces a comparatively large change in the output of the pickup.

Briefly, I accomplish the foregoing and other objects of the invention by providing a gauge embodying an electromagnetic transducer or pickup in which a movable armature varies the reluctance of magnetic circuits linking a pair of outer coils with a center coil, the output of the transducer being connected to an amplifying and indicating circuit that is preferably constructed and arranged in accordance with the disclosure of United States Patent No. 2,508,370 issued May 23, 1950, on application of Michael Bozoian and assigned to the assignee of the present application. Longitudinal movement of the armature varies the output of the transducer; the armature is mounted on an elongated armature support that is rigidly connected to a gauging point which makes contact with the work and the armature support is mounted on supporting springs arranged to minimize the amount of lateral or rocking movement resulting from transverse forces applied to the gauging point while the armature is made short and is positioned on the support to minimize the effects of any such movements on the magnetic circuit. The short armature is made possible by a compact arrangement of the coils of the transducer with the center coil on one side of the armature and the outer coils on the opposite side, while the pole faces of the outer coils are narrow in the direction of movement of the armature so that a small movement of the armature with respect to the pole faces will produce a comparatively large percentage change in the reluctance of the magnetic circuits. All of these and other factors cooperate with each other and with the preferred amplifier and indicator to produce an extremely sensitive, accurate, reliable, sturdy and compact instrument.

Figure 2:
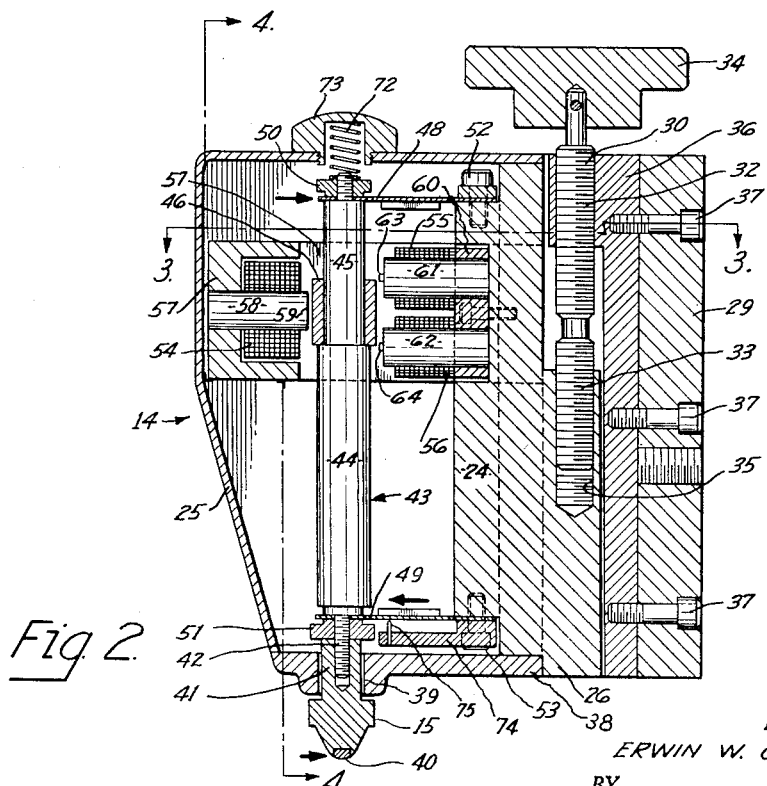

A preferred form of the invention is illustrated in the accompanying drawings in which Figure 1 is a side elevation of a gauge embodying my invention, illustrating a preferred form of my gauge head mounted on a stand and connected to an electronic indicator or amplifier, the amplifier being shown on a reduced scale as compared to the gauge itself; Figure 2 is a vertical section on an enlarged scale through the gauge head shown in Figure 1; Figure 3 is a horizontal section taken as indicated by line 3—3 of Figure 2; Figure 4 is a vertical section taken as indicated by line 4—4 of Figure 2; Figure 5 is an end view of the pole piece of one of the coils; Figures 6 and 7 are plan and side elevational views respectively of one of the spring members used for mounting the armature support in the gauge head, and Figures 8 and 9 are wiring diagrams showing two different circuits for connecting coils of the electromagnetic pickup to input and output circuits.

As shown in Figure 1, a gauge embodying my invention may comprise a stand indicated having a base 10, a horizontally extending portion 11 and a vertically extending portion 12. An anvil 13 is mounted on the horizontally extending portion 11, the anvil being arranged to support an object to be measured. The vertically extending portion 12 of the frame carries the gauge head indicated in general at 14; the gauge head carries within it an electromagnetic pickup to be described below and is provided with a gauging point 15 which contacts an object to be measured or workpiece W resting on anvil 13. To provide for adjustment for objects of various sizes the gauge head is mounted for sliding vertical adjustment with respect to the leg 12 by any convenient means such as, for example, a conventional rack and pinion mechanism (not shown) controlled by the coarse adjustment knob 16. The output of the gauge head 14 is connected by a braided cable 17 to the amplifier and indicator indicated in general at 18; the amplifier is preferably constructed in accordance with the disclosure of the aforesaid Bozoian patent to which reference is made for a complete description of the amplifier circuits. For the purpose of the present application, it will suffice to state that the output of the amplifier is applied to the zero-center meter 19; the deflection of the needle of the meter to either side of the zero position indicates the amount by which an object being measured by the gauge deviates from a predetermined standard. The switch 20 of the amplifier adjusts the electrical circuits for coarse and fine readings. In the present embodiment, in the fine setting each division of the scale of meter 19 represents one one-millionth (0.000001) of an inch, whereas with the coarse setting each division of the scale represents one one-hundred-thousandth (0.00001) of an inch. Knob 21 is utilized to make final adjustment of the zero setting of the needle, and reference character 22 indicates a light that burns when the instrument is turned on. The present application is not directed to the amplifier per se, but relates particularly to the gauge head 14 and the combination.

As shown in Figures 2, 3 and 4, the gauge head 14 preferably comprises a base or frame portion 24 on which a housing 25 is mounted, the transducer or pickup being disposed within the housing and supported by the frame 24. Frame 24 has a dovetail slide portion 26 which slides within a dovetail slot 27 of mounting block 29 (see Figures 2 and 3). Mounting block 29 is supported for sliding movement as mentioned above on the vertical leg 12 of the stand and is movable vertically by means of knob 16 to provide for coarse vertical adjustment of the position of the gauge head 14 and gauging point 15 with respect to the anvil 13.

In order to provide for precise vertical adjustment of the gauge head and gauging point with respect to the anvil, a differential screw mechanism is preferably employed. This consists of a differential screw 30 having threaded portions 32 and 33 of the same hand and slightly different pitch, the screw being rotatable by adjustment knob 34. Threaded portion 33 of the screw is engaged within the threaded bore 35 of the frame 24, and threaded portion 32 is engaged within the threaded bore of the stationary nut member 36 which is secured to the block 29 as by screws 37. With this arrangement, it will be evident that very fine and precise vertical adjustment of the gauge head 14 can be made by rotating the knob 34.

The gauging point 15 extends through an opening 39 in the bottom plate 38 of the housing 26 and is preferably provided with a spherical point 40 composed of sapphire or other very hard material for engaging the work to be measured. The shank portion 41 of the gauging point is threaded onto the stem 42 of the armature support 43. The armature support preferably consists of a cylindrical rod having an enlarged portion 44 and a reduced portion 45 on which the armature 46 is supported.

In order to mount the armature support for movements in directions parallel to its own axis, I preferably employ a pair of leaf spring members 48 and 49 which are firmly clamped to the armature support adjacent to the ends thereof by nuts 50 and 51 and to the frame member 24 by screws 52 and 53. Springs 48 and 49 are preferably constructed as described and claimed in my co-pending application Serial No. 785,315, filed November 12, 1947. The end of the shank of the gauging point 15 bears firmly against nut 51 and thus the armature support 43 and the gauging point 15 constitute in effect a single rigid member. Movements of the gauging point in response to pressure exerted thereon by the work therefore result in corresponding longitudinal movements of the armature 46, and these movements are utilized to generate the signal that is measured and indicated by the meter 19.

The coils of the electromagnetic transducer or pickup for generating the required signal comprise an intermediate coil and a pair of outer coils arranged so that upon movement of the armature the reluctance of the magnetic circuit linking one of the outer coils with the intermediate coil is increased while the reluctance of the magnetic circuit linking the other of the outer coils with the intermediate coil is decreased. A pickup of this general type is disclosed in my co-pending application aforesaid. The pickup of the present application, however, is of an improved construction arranged to give greater sensitivity and to have greater freedom from extraneous influences such as stray magnetic fields, lateral forces applied to the gauging point and the like than the pickup specifically disclosed in my said application. The preferred pickup comprises an intermediate coil 54 and outer coils 55 and 56. The coils are connected to cable 17 through suitable leads (not shown). Intermediate coil 54 is mounted in a U-shaped frame member 57 secured to the frame 24; the intermediate coil is thus disposed on the side of the armature 46 away from the frame 24. The outer coils 55 and 56 are supported by the coil supporting block 60 which is disposed in a recess in the frame member 24; the center lines of the two outer coils are equally distant from the center line of the intermediate coil 54. The positioning of the coil 54 away from the coils 55 and 56 makes it possible to dispose coils 55 and 56 side by side in a compact arrangement; accordingly a short armature with a relatively long armature support can be employed with resulting advantages described below, or a very compact gauge head can be constructed if the preferred, relatively long armature support is not required.

Coil 54 has a core 58 having a flat circular face 59. Coils 55 and 56 have cores 61 and 62, pressed into block 60 and having projecting pole faces 63 and 64 which are of narrow (e. g., of the order of 0.010 to 0.020 inch in a preferred form of apparatus), rectangular cross-section; the long axes of the pole faces extending transversely of the axis of the armature 46 and armature support 43 (see Figures 2, 3 and 5).

In order to secure greater flux density in pole faces 63 and 64 they are preferably made shorter than the diameter of the cores 61 and 62, a length of approximately 0.050 inch being found to be satisfactory in a preferred form of apparatus.

Armature 46 consists of a sleeve of ferro-magnetic material pressed onto the reduced portion 45 of the armature support 43. Opposite surfaces 65 and 66 thereof (see Figure 3) are flat and are disposed parallel and close to (e. g., a spacing of approximately 0.002 inch is employed in a preferred form of apparatus) the planes of the pole faces 59 and 63 and 64 respectively. The length of the flat surface 65 of the armature 46 is substantially greater than the diameter of the pole face 59; hence, movement of the armature 46 in a direction parallel to its axis does not substantially change the air gap between pole face 59 and the armature. The length of face 66 of the armature is substantially equal to the center-to-center distance between the pole faces 63 and 64 of coils 55 and 56. In neutral or midposition, the flat face 66 of the armature extends substantially half way across both pole faces 63 and 64; the air gaps between the pole faces and the armature are substantially equal, and the magnetic circuits linking coil 54 and coil 55, and coil 54 and coil 56 have substantially the same reluctance. With this arrangement, movement of the armature in an upward direction, for example, will increase the overlap of pole face 63 and armature 46, and simultaneously reduce the overlap of pole face 64 and armature 46, thus reducing the reluctance of the magnetic circuit including coil 55 and increasing the reluctance of the magnetic circuit including coil 56. The magnetic flux is concentrated in the narrow pole faces 63 and 64 which project substantially beyond the cores 61 and 62. Because of the narrowness of the pole faces, a minute vertical movement of the armature 46 results in a substantial change in terms of percentage in the reluctance of the magnetic circuits.

With this arrangement, as described in the aforesaid Bozoian patent and in my aforesaid co-pending application, when the intermediate coil 54 is excited from a suitable A. C. source, A. C. voltages will be induced in coils 55 and 56 and, upon movement of armature 46 from its neutral position, the output of one of the coils will be increased while the output of the other coil will be decreased. These coils are connected in series in such manner that the voltages induced in the two coils oppose each other, as shown in Figure 8, and the output of the opposed coils is connected through transformer 68 to the amplifier, condenser 69 being connected across the transformer secondary. The output of the amplifier is applied to meter 19 to give an indication of the magnitude and direction of movement of the armature 46 from neutral position. Thus, if the apparatus is set so that the meter reads zero with the gauging point in contact with a standard gauge such as a Johannson gauge block then, if the gauge block is removed and an object to be measured inserted in place of the gauge block the deflection of the needle of the meter will show the deviation of the object from the standard gauge.

In the circuit shown in the Bozoian patent and in Figure 8 hereof the intermediate coil is excited and the outer coils are connected to the amplifier. This is ordinarily the preferred form, but for some installations it is preferred to energize the outer coils and connect the intermediate coil to the amplifier. Such an arrangement is shown in Figure 9. The exciting coils 55a and 56a are connected in series and wound so that the fields generated by the coils oppose each other, i. e., the fields are 180° out of phase. When the armature is in neutral position the fields neutralize each other and no voltage is induced in the intermediate coil 54a. Movement of the armature in one direction or the other unbalances the magnetic circuits; the magnitude of the voltage induced in the intermediate coil 54a depends on the amount of displacement of the armature and the phase depends on the direction of displacement. Hence the output of the intermediate coil is similar to the output of the coils 55 and 56 in the previously described form and an indication of the amount and direction of the displacement of the armature can be obtained by connecting coil 54a to an amplifier of the type shown in the said Bozoian patent, transformer 68 and condenser 69 being employed as before. Those skilled in the art will appreciate that reversing the connections will require an increase in the number of turns of wire in coils 55a and 56a as compared with coils 55 and 56 and a decrease in the number of turns in coil 54a as compared to coil 54, so as to make the impedances of the outer and intermediate coils of Figure 9 substantially equal to the impedances of the intermediate and outer coils respectively of Figure 8.

In the preferred form of apparatus, the scale divisions on the meter 19 are approximately five sixty-fourths of an inch apart. It follows then that if movement of one-millionth of an inch of the gauge point 15 and, hence of the armature 46, is to cause a deflection of the needle of one division or five sixty-fourths inch, the movement of the gauging point must be amplified about 78,000 times. This extremely high amplification makes it essential to construct the instrument so that insofar as possible the meter responds only to signals given to it as a result of movements of the gauging point 15 in gauging directions (vertical movements in the embodiment shown). This involves two different but interrelated groups of problems. One of these has to do with the mechanical construction and mounting of the gauging point, armature support and armature so that the effects of deflection of the parts due to forces other than those exerted on the gauging point and in the gauging direction are minimized; the other has to do with the electromagnetic circuits which are arranged to minimize the effects of extraneous magnetic fields and to minimize the effects of deflections or movements of the armature in directions other than directions parallel to its own axis.

As noted above, the armature support 43 is carried by leaf spring members 48 and 49. These act as links to support the armature support for movement in directions parallel to its own axis. Because of the action of members 48 and 49, vertical movements of the armature support necessarily result in some slight lateral movements thereof. It will be evident that so long as the armature support remains parallel to itself, small amounts of lateral movements of the axis thereof toward or away from the pole faces 63 and 64 do not substantially affect the output of the gauge head because the face 66 of the armature remains in a plane parallel to the planes of the pole faces 63 and 64. Any lateral movement of the armature support because of the arcuate movement of the ends of the springs 48 and 49 is very minute within the normal range of movement of the gauging point (the range is 0.000020 inch for the full scale of meter 19 in a preferred embodiment) and without effect on the accuracy of the instrument.

However, non-parallel movement or bending of the armature support would introduce inaccuracy into the instrument by changing the relative dimensions of the air gaps between face 66 of the armature and pole faces 63 and 64. Non-parallel movement of the armature support could result from improper action of the springs 48 and 49. The action of these springs is controlled and made uniform by their design, the springs being constructed and arranged as described and claimed in my aforesaid co-pending application, Serial No. 785,315, filed November 12, 1947, and as shown in Figures 6 and 7 of the drawings. As described in detail in my said application, the springs are weakened by slots 70 which are disposed immediately adjacent to zones wherein the springs are clamped to the base 24 and by arcuate slots 70a which extend approximately half way around the zones of clamping of the springs to the armature support 43. With this construction and with the stiffening flanges 71 on the sides of the springs, the bending action of the springs is controlled and localized in the zones adjacent the ends of the springs, the intermediate portions of the springs acting substantially as rigid links. Thus, the springs have uniform and substantially identical action, and movement of the gauging point in gauging directions results only in movement of the armature support in directions parallel to the axis and without substantial rocking movement.

Lateral forces are imposed on the gauging point when an object to be measured is slid beneath it. These forces, while they are small in magnitude, nevertheless, must be given careful consideration in a highly sensitive gauge such as the one disclosed herein. Lateral forces applied to the gauging point toward or away from the base 24 exert forces on the springs 48 and 49 tending to compress or shorten one of the springs and to stretch or elongate the other spring, depending upon the direction of the force. Such forces also tend to bend the armature support 43. In order to prevent lateral forces from substantially rocking or tilting the armature 46 and thereby introducing inaccuracies into the instrument, the effects of such lateral forces must be minimized by the design of the instrument; it is impractical, if not impossible, to build an instrument in which the parts are so rigid that they do not deflect under the forces encountered in ordinary operation.

According to the present invention, the effect of compressing and stretching the supporting springs is minimized by positioning the springs at the ends of the armature support and by having the distance between the springs great as compared to the length of the armature; thus, in the embodiment shown in the drawing, the distance between the springs 48 and 49 is a little more than six times the length of the armature 46. If a lateral force should be applied to the end of the gauging point 15 great enough to cause a change in the relative lengths of the springs 48 and 49 of one-millionth of an inch, then the effect on the air gaps between armature 46 and pole faces 63 and 64 would only be 1/6 of this amount, assuming that no other deflections took place in the apparatus. A deflection of 1/6 of one-millionth of an inch would be of very small moment in the apparatus inasmuch as the air gaps between the armature 46 and the pole faces 63 and 64 measured in directions perpendicular to pole faces are normally about 0.002 inch.

The other effect of a lateral force on the armature support is to bend it. This effect is resisted by constructing the armature support with the enlarged portion 44 as rigid as possible and by spacing the coils 58, 61 and 62 away from the spring 49 as far as possible. If the armature support is considered as a beam supported by springs 48 and 49, then a force applied in the direction of the arrow in Figure 2 to the tip 40 of the gauging point is balanced by an opposite force applied by the spring 49 and a force in the same direction applied by the spring 48 as indicated by the arrows adjacent the springs in Figure 2. Such a force therefore tends to bend the armature support and thus to rock the armature in a manner to move it relatively away from pole face 64 and toward pole face 63. In the present design, however, the effect of this bending is minimized because the armature 46 is disposed beyond the mid point of the armature support and near the spring 48 and is spaced a substantial distance away from the spring 49; in the preferred embodiment shown the distance from spring 49 to the center of the armature is more than twice the distance from the spring 49 to the tip 40 and the distance between the springs 48 and 49 is at least three times the distance from the tip 40 to the spring 49. Thus, the bending moments in the armature support are minimized by the relatively short distance between the tip 40 and spring 49, the armature is carried at a zone where the bending moments applied to the armature support are much less than the maximum bending moments which are present adjacent to spring 49 and the effect of whatever bending may take place is minimized by the relative shortness of the armature 46 made possible by the close spacing of the pole faces 63 and 64.

Furthermore, it is to be noted that any rocking movements of the armature 46 because of lateral forces applied to the gauging point tend to counterbalance each other. As pointed out above, a force in the direction of the arrow in Figure 2 tends to bend the armature support to decrease, relatively, the gap between armature 46 and pole face 63 and increase the gap between armature 46 and pole face 64. On the other hand, movement of the armature support resulting from the lengthening and shortening of the springs 48 and 49 due to the same force has precisely the opposite effect and tends to increase the distance between the armature 46 and pole face 63 and decrease the distance between the armature 46 and pole face 64. Thus, any possible errors tend to cancel each other and, in usual operation, the forces ordinarily applied to the gauging point have no substantial effect on the reading of the instrument.

Forces transverse to these directions and normal to the axis of the armature support 43 are also without substantial effect on the instrument. The deflection of the armature support under the influence of such forces is minimized by the supporting springs which have wide bases to enable them to resist lateral deflection, and the flat faces 65 and 66 of armature 46 are greater in width than the pole faces 59, 63 and 64. The result is that the air gaps are not substantially affected by any slight lateral deflection of the armature that may take place as a result of transverse forces or components, whether the deflection is due to bending of the armature support or deflection of the supporting springs.

The arrangement of the coils 54, 55 and 56 contributes in an important manner to minimizing the effect of deflection of the armature support for the reason that with the coil 54 on one side of the armature and the coils 55 and 56 on the other, the coils 55 and 56 can be closely spaced, the length of the armature 46 can be maintained at a minimum and the effect of any rocking movement of the armature in terms of changes in the perpendicular distances between the armature face 66 and the pole faces 63 and 64 is minimized.

The closeness of the spacing of coils 55 and 56 has another important advantage in that the effects of extraneous magnetic fields are minimized. The turns of coils 55 and 56 extend in the same direction as shown in Figure 8, but the coils are connected in opposition. Thus, the same magnetic flux permeating both coils induces equal voltages therein, but these voltages are cancelled because the coils are connected in opposition. The close spacing of the coils insures that coils 54 and 55 will be subjected to substantially equal effects from stray magnetic fields. Furthermore, the U-shaped support 57, which is composed of magnetic material, acts as a shield which further minimizes the effects of stray magnetic fields on coils 54 and 55. In the modified form shown in Figure 9, the support 57 effectively shields the secondary coil 54a from the effects of stray fields.

Because the design of the gauge head minimizes effects of deflection of the parts, it is not necessary to attempt to make the parts so massive and rigid as to eliminate deflection. Therefore, the springs 48 and 49 can be of comparatively light construction with the result that only light pressures on the tip 40 of the gauging point are required to move the armature support in axial directions. The gauging pressure, which preferably is in the order of 2 to 5 ounces, is furnished by a spring 72 which acts between nut 50 and cap 73 carried by the upper surface of housing 25. Downward movement of the armature support in response to the pressure of the spring 72 is limited by stop 75 which engages the underside of spring 49 and is supported by a bracket 74 extending outwardly from the base 24 and held in place by screws 53. Preferably, the total permissible vertical movement of the armature support 44 between stops is of the order of five thousandths of an inch. Thus, the springs 48 and 49 are not subject to undue strains.

The lightness of the gauging pressure is important because with heavy gauging pressures and relatively soft material, the gauging point itself may be indented into the material sufficiently to give a false reading of the instrument; also, the lightness of the gauging pressure minimizes the possibility of scratching objects which are being gauged, and reduces lateral forces that are applied to the gauging point as the objects are placed under it.

In operation the amplifier 18 is turned on and permitted to warm up, then a standard gauge, such as a gauge block, is positioned on the anvil 13 and the gauging point 15 brought into contact with it. The first adjustment of the position of the gauge head with respect to the standard gauge is made with the coarse adjustment knob 16; fine adjustment is made with the fine adjustment knob 34 which is used to bring the needle of the gauge 19 as close as possible to zero, and final adjustment is made by the knob 21 which adjusts the amplifier to bring the needle to zero position. Then the standard gauge or the like is removed and an object to be measured is positioned on the anvil and slid under the gauge point 15. The meter 19 then indicates the deviation of the object from the standard gauge. The direction of movement of the needle indicates whether the object is larger or smaller than the standard and, depending upon the adjustment of the switch 20, each division of the gauge indicates either one one-millionth of an inch or one one-hundred thousandth of an inch. Variations in dimensions of the object at different points on the surface thereof can be observed by moving the object beneath the gauge block.

In service, the gauge is steady and reliable. The needle gives instantaneous readings without overtravel. Unskilled operators can duplicate results to within one-half of one-millionth of an inch repeatedly. No particular care need be exercised in placing the work on the anvil and beneath the gauging point because transverse forces on the gauging point have no substantial effect on the reading of the meter. It is necessary, however, for the operator to handle the gauges and the objects being measured as little as possible because the effect of changes in temperature on the work is promptly noticeable in movements of the needle of the meter. This, of course, is due to the extreme sensitivity of the device. The operator also must refrain from resting his hand on the gauging head or on the vertical leg 12 of the frame during gauging operations because even hand pressures on these parts can deflect them sufficiently to affect the reading of the instrument.

From the foregoing, it will be apparent that I have provided a gauge, comparator or the like of extremely high sensitivity and accuracy. In spite of its high sensitivity, the gauge is of sturdy construction and in operation unskilled operators can make repeated measurements with high accuracy. The gauge is light and compact and hence adaptable to a wide variety of uses.

Because of its design and construction, the accuracy of the gauge is not impaired by stray magnetic fields and because of the lightness of the gauging pressures required, the parts being gauged are not subject to substantial indentation, scratching or wear by the gauging point.

Those skilled in the art will understand that the foregoing description is given by way of example and that various changes and modifications can be made in the invention without departing from the spirit and scope thereof.

I claim:

1. A magnetic pickup for a micrometer, comparator or the like comprising a frame, an armature support comprising an elongated rod carrying a gauging point at one end thereof, a pair of leaf springs mounted in said frame for supporting said armature support for axial movement, the first of said springs engaging said armature support near the end thereof carrying said gauging point, the second of said springs engaging said armature support adjacent the other end thereof, an armature composed of ferro-magnetic material mounted on said armature support on the half thereof adjacent said second spring, an intermediate coil mounted in said frame and having a pole piece extending into close proximity to the longitudinal center of said armature on one side thereof, a pair of coils mounted in said frame and having pole pieces extending into close proximity to the opposite side of said armature adjacent the ends thereof, whereby longitudinal movement of said armature with respect to said coils increases the reluctance of the magnetic circuit between said intermediate coil and one of said pair of coils and simultaneously decreases the reluctance of the magnetic circuit between said intermediate coil and the other of said pair of coils.

2. A pickup as defined in claim 1 wherein the armature sleeve has flat axially extending surfaces disposed adjacent said pole pieces.

3. A pickup as defined in claim 1 wherein the pole pieces of said pair of coils terminate in narrow rectangular pole faces extending transversely of the longitudinal axis of the armatures.

4. A pickup as defined in claim 1 wherein the armature sleeve has flat surfaces disposed adjacent said pole pieces and wherein the pole pieces of said pair of coils terminate in narrow rectangular pole faces extending transversely of the longitudinal axis of the armature, the length of the armature being substantially equal to the center-to-center distance between said pole faces.

5. A pickup as defined in claim 1 wherein the distance between said springs is at least three times the distance between the work-contacting surface of the gauging point and the first spring.

6. A pickup as defined in claim 1 wherein the distance between said springs is at least six times the length of said armature.

7. A magnetic pickup for a micrometer, comparator or the like comprising a frame, an armature support comprising an elongated rod carrying a gauging point at one end thereof, a pair of leaf springs mounted in said frame for supporting said armature support for axial movement, the first of said springs engaging said armature support near the end thereof carrying said gauging point, the second of said springs engaging said armature support adjacent the other end thereof, the distance between said springs being at least three times the distance between the gauging point and said first spring, said armature support having an enlarged portion extending from said first spring at least half the distance toward said second spring and a reduced portion extending from the end of said enlarged portion toward said second spring, an armature composed of ferro-magnetic material mounted on said reduced portion, an intermediate coil mounted in said frame and having a pole piece extending into close proximity to the longitudinal center of said armature, a pair of coils mounted in said frame and having pole pieces extending into close proximity to said armature adjacent the ends thereof, whereby longitudinal movement of said armature with respect to said coils increases the reluctance of the magnetic circuit between said intermediate coil and one of said pair of coils and simultaneously decreases the reluctance of the magnetic circuit between said intermediate coil and the other of said pair of coils.

8. A magnetic pickup for a micrometer, comparator or the like comprising a frame, an armature support comprising an elongated rod carrying a gauging point at one end thereof, a pair of supporting members for said armature support, the first of said supporting members engaging said armature support near the end thereof carrying said gauging point, the second of said supporting members engaging said armature support adjacent the other end thereof, an armature carried by said armature support and disposed between said supporting members and substantially nearer said second supporting member than said first supporting member, the distance between said supporting members being at least three times the distance between the gauging point and said first support and at least six times the length of said armature, an intermediate coil mounted in said frame and having a pole piece extending into close proximity to the longitudinal center of said armature, and a pair of coils mounted in said frame and having pole pieces extending into close proximity to the opposite ends of said armature adjacent the ends thereof.

9. A magnetic pickup for a micrometer, comparator or the like comprising a frame, an armature support comprising an elongated rod, carrying a gauging point at one end thereof, a pair of supporting members for said armature support, the first of said supporting members engaging said armature support near the end thereof carrying said gauging point, the second of said supporting members engaging said armature support adjacent the other end thereof, an armature carried by said armature support and disposed between said supporting members and substantially nearer said second supporting member than said first support, the distance between said supporting members being at least three times the distance between the gauging point and said first supporting member and at least six times the length of said armature.

10. In a gauge, comparator or the like, a magnetic pickup comprising a frame structure, an armature support comprising an elongated rod carrying a gauging point at one end thereof, a pair of leaf springs mounted in said frame for supporting said armature support for axial movement, the first of said springs engaging said armature support near the end thereof carrying said gauging point, the second of said springs engaging said armature support adjacent the other end thereof, the distance between said springs being at least three times the distance between the gauging point and said first spring, said armature support having an enlarged portion extending from said first spring at least half the distance toward said second spring and a reduced portion extending from the end of said enlarged portion toward said second spring, an armature in the form of a sleeve composed of ferro-magnetic material mounted on said reduced portion, said sleeve having flat surfaces on opposite sides thereof, said surfaces lying in planes parallel to the axis of said armature support, an intermediate coil mounted in said frame structure and having a pole piece extending into close proximity to the longitudinal central portion of one of said surfaces of said armature, a pair of coils mounted in said frame and having pole faces disposed in a plane parallel to the other of said flat surfaces of said armature and extending into close proximity thereto, the end portions of said surface of said armature overlying each of the pole faces of said pair of coils in part only, whereby longitudinal movement of said armature with respect to said coils increases the overlap of the armature with the pole face of one of the coils of said pair and decreases the overlap of the armature with the pole face of the other coil of said pair and thereby decreases the reluctance of the magnetic circuit between said intermediate coil and one of said pair of coils and simultaneously increases the reluctance of the magnetic circuit between said intermediate coil and the other of said pair of coils, circuit means for creating a magnetic flux linking said coils, and circuit means responsive to changes in induced voltages due to said changes in reluctance for indicating movements of said armature.

11. In a gauge, comparator or the like, a magnetic pickup comprising a frame structure, an armature support comprising an elongated rod carrying a gauging point at one end thereof, a pair of leaf springs mounted in said frame for supporting said armature support for axial movement, the first of said springs engaging said armature support near the end thereof carrying said gauging point, the second of said springs engaging said armature support adjacent the other end thereof, the distance between said springs being at least three times the distance between the gauging point and said first spring, said armature support having an enlarged portion extending from said first spring at least half the distance toward said second spring and a reduced portion extending from the end of said enlarged portion toward said second spring, an armature in the form of a sleeve composed of ferro-magnetic material mounted on said reduced portion, said sleeve having flat surfaces on opposite sides thereof, said surfaces lying in planes parallel to the axis of said armature support, an intermediate coil mounted in said frame structure and having a pole piece extending into close proximity to the longitudinal central portion of one of said flat surfaces of said armature, a pair of coils mounted in said frame and having pole faces disposed in a plane parallel to the other of said flat surfaces of said armature and extending into close proximity thereto, the end portions of said surface of said armature overlying each of said pole faces of said pair of coils in part only.

12. In a gauge, comparator or the like, a magnetic pickup comprising a frame structure, an armature supported on said frame structure for movement along its axis with respect to said frame structure, said armature having flat surfaces on opposite sides thereof, said surfaces lying in planes parallel to the axis of said armature, an intermediate coil mounted in said frame structure and having a pole piece extending into close proximity to the longitudinal central portion of one of said flat surfaces of said armature, a pair of coils mounted in said frame and having pole faces disposed in a plane parallel to the other of said flat surfaces of said armature and extending into close proximity thereto, the end portions of said surface of said armature overlying each of said pole faces of said pair of coils in part only, whereby longitudinal movement of said armature with respect to said coils increases the overlap of the armature with the pole face of one coil of said pair and decreases the overlap of the armature with the pole face of the other coil of said pair and thereby decreases the reluctance of the magnetic circuit between said intermediate coil and one of said pair of coils and simultaneously increases the reluctance of the magnetic circuit between said intermediate coil and the other of said pair of coils.

13. A pickup according to claim 12 wherein the pole faces of said pair of coils are in the form of narrow rectangles with the long axes of the rectangles extending at right angles to the axis of the armature.

14. A pickup according to claim 13 wherein the width of the rectangular pole faces is from 0.010 to approximately 0.020 inch.

15. In a gauge, comparator or the like, a magnetic pickup comprising a frame structure, an armature supported for longitudinal movement with respect to said frame, said armature having flat surfaces on opposite sides thereof, said surfaces lying in planes parallel to the axis of said armature, an intermediate coil mounted in said frame structure and having a pole piece extending into close proximity to the longitudinal central portion of one of said flat surfaces of said armature, a pair of coils mounted side by side in said frame and having pole faces disposed in a plane parallel to the other of said flat surfaces of said armature and extending into close proximity thereto, the end portions of said surface of said armature overlying each of said pole faces of said pair of coils in part only, whereby longitudinal movement of said armature with respect to said coils increases the overlap of the armature with one of the pole faces of one coil of said pair and decreases the overlap of the armature with the pole face of the other coil of said pair and thereby decreases the reluctance of the magnetic circuit between said intermediate coil and one of said pair of coils and simultaneously increases the reluctance of the magnetic circuit between said intermediate coil and the other of said pair of coils, said coils of said pair being wound in the same direction and being connected in series opposition whereby voltages induced in said coils of said pair by stray magnetic fields substantially neutralize each other.

16. A magnetic pickup for a micrometer, a comparator or the like comprising a base frame, a pair of juxtaposed coils carried by said base frame and having spaced pole faces, a U-shaped frame member extending outwardly from said base frame with the legs of the U encompassing said pair of coils and the base of the U spaced from said base frame, a third coil mounted in said U-shaped frame member adjacent to the base thereof, said third coil having a pole face spaced from the pole faces of said pair of coils, and an armature supported by said base frame and disposed in the air gap between the pole face of said third coil and the pole faces of said pair of coils.

17. A pickup according to claim 16 wherein said pair of coils are wound in the same direction and connected in series in opposition to each other.

18. A magnetic pickup for a micrometer, comparator or the like comprising a base frame, a pair of juxtaposed coils carried by said base frame and having spaced pole faces lying in a common plane, an armature supported by said base frame member with its axis parallel to the plane of said pole faces, a U-shaped frame member extending outwardly from said base frame with the legs of the U encompassing said pair of coils and the base of the U spaced from said base frame, a third coil mounted in said U-shaped frame member adjacent the base thereof, said third coil having a pole face disposed in a plane spaced from the plane of the pole faces of said pair of coils and parallel to the axis of said armature, the axis of said third coil being equidistant from the axes of said pair of coils.

19. In a gauge, comparator or the like, a magnetic pickup comprising a frame structure, an armature supported on said frame structure for movement along its axis with respect to said frame structure, a center coil mounted in said frame structure and having a pole face extending into close proximity to the longitudinal central portion of said armature on one side thereof, a pair of coils mounted in said frame structure and having pole faces extending into close proximity to the opposite side of said armature adjacent the ends thereof, the end portions of said armature overlying each of said pole faces of said pair of coils in part only, whereby longitudinal movement of said armature with respect to said coils increases the overlap of the armature with one of said pole faces and decreases the overlap of the armature with the other of said pole faces and thereby decreases the reluctance of the magnetic circuit between said center coil and one of said pair of coils and simultaneously increases the reluctance of the magnetic circuit between said center coil and the other of said pair of coils, the configuration of said pole faces of said pair of coils substantially conforming to the configuration of the surface of said armature adjacent thereto.

ERWIN W. GRAHAM.

REFERENCES CITED

The following references are of record in the file of this patent:

UNITED STATES PATENTS

| Number | Name | Date |
|---|---|---|
| 2,408,524 | Mestas | Oct. 1, 1946 |
| 2,437,639 | Floyd | Mar. 9, 1948 |
| 2,445,455 | Rights et al. | July 20, 1948 |
| 2,508,370 | Bozoian | May 23, 1950 |
| 2,564,221 | Hornfeck | Aug. 14, 1951 |